July 4, 1950 J. P. VEATCH ET AL 2,513,384
APERIODIC RADIO RECEIVER
Filed Feb. 14, 1947
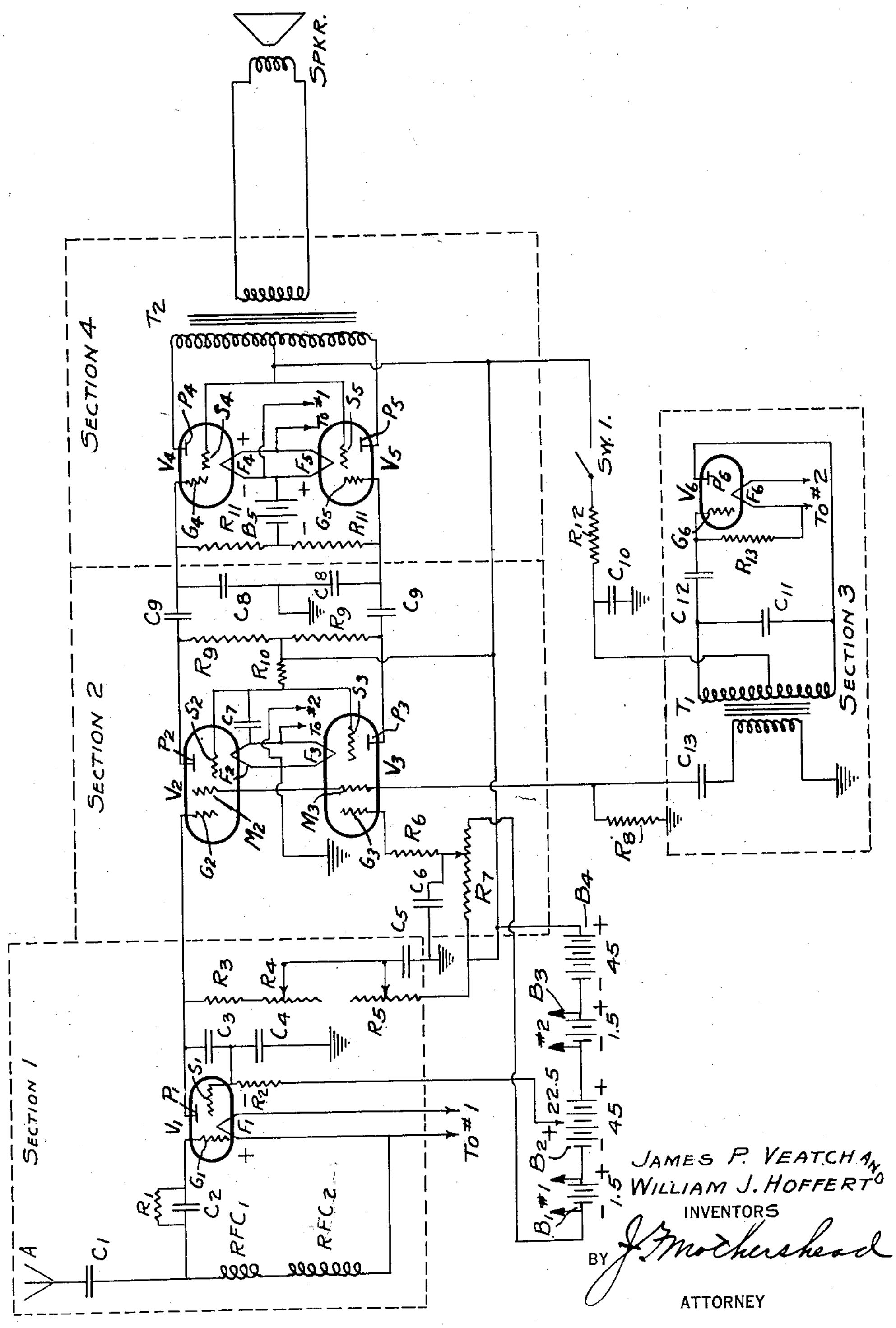
JAMES P. VEATCH AND
WILLIAM J. HOFFERT
INVENTORS
BY J. F. Mothershead
ATTORNEY Patented July 4, 1950 2,513,384

UNITED STATES PATENT OFFICE 2,513,384

APERIODIC RADIO RECEIVER

James P. Veatch, Arlington, Va., and William J. Hoffert, Santa Ana, Calif.

Application February 14, 1947, Serial No. 728,431

3 Claims. (Cl. 250—8)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (Ch. 460, 45 Stat. L. 467).

This invention relates to an aperiodic radio receiver and more particularly to a radio receiver capable of responding to transmitted signals through a large frequency range.

It is desirable, in monitoring all radio transmission in a locality, to use a receiver capable of indicating transmission by any of a large number of methods. Law enforcement agencies, in particular, have need of a radio receiver which will detect radio transmission when the time, frequency and type of transmission are unknown. The required receiver must, when placed in a suspected area, give an indication when a relatively strong radio-frequency field is created.

Previous attempts to produce such an aperiodic receiver, in which sensitivity was sought by use of radio-frequency amplifiers, have not been satisfactory because no method has been found which will accomplish the required amplification over a wide range of frequencies.

One object of this invention is to provide a radio receiver capable of responding simultaneously to radio signals transmitted on any of a large range of frequencies.

Another object of this invention is to provide a radio capable of responding to radio communication through a large range of frequencies without the necessity of tuning to a particular frequency or group of frequencies.

Another object of this invention is to provide a radio capable of responding to a wide variety of types of radio transmission.

A further object of this invention is to provide an aperiodic radio receiver capable of responding to keyed continuous wave radio signals.

Other objects will become apparent from the following specification taken in connection with the accompanying drawing which shows a schematic diagram embodying the principles of this invention.

Referring now to the drawing for a general description of the invention, section 1 includes the antenna, input circuit and detector. Section 2 comprises a "push-pull" balanced amplifier. Section 3 is an oscillator capable of producing an audible local frequency. Section 4 includes a "push-pull" balanced amplifier and an output indicator.

In operation, a signal is received and detected in section 1 and supplied to section 2 which is unbalanced thereby. The local frequency produced by section 3 is also applied to section 2 which when unbalanced passes on the local frequency to section 4 where it is further amplified and indicated.

To explain the invention in further detail, section 1 includes antenna A connected in series with condenser $C_1$, inductance coils $RFC_1$ and $RFC_2$ and thence to filament $F_1$ of tube $V_1$. Batteries $B_1$, $B_2$, $B_3$, and $B_4$ are connected in series, the filament $F_1$ being connected to leads #1 from battery $B_1$. Batteries $B_1$ and $B_3$ supply 1.5 volts, while batteries $B_2$ and $B_4$ supply 45 volts. Ground is effectively placed between batteries $B_3$ and $B_4$ by connections through leads #2 from battery $B_3$ to filament $F_2$ of tube $V_2$.

The conductor between condenser $C_1$ and choke $RFC_1$ is connected through condenser $C_2$, connected in parallel with resistor $R_1$, to control grid $G_1$ of tube $V_1$. Screen grid $S_1$ of tube $V_1$ is connected through resistor $R_2$ to a central tap on battery $B_2$. Plate $P_1$ of tube $V_1$ is connected through resistor $R_3$, rheostats $R_4$ and $R_5$, and potentiometer $R_7$ to the negative side of battery $B_1$. The junction of rheostats $R_4$ and $R_5$ is connected to ground through condenser $C_5$. Plate $P_1$ is also connected through condensers $C_3$ and $C_4$ to ground. The junction of condensers $C_3$ and $C_4$ is connected to screen grid $S_1$ of tube $V_1$.

The plate $P_1$ of tube $V_1$ is also connected in direct current connection to the first control grid $G_2$ of tube $V_2$ of section 2. Tube $V_2$ is connected in balanced push-pull relation with tube $V_3$, the filaments $F_2$ and $F_3$ being connected in parallel and supplied with current through leads #2 of battery $B_3$. One side of filaments $F_2$—$F_3$ is grounded. Screen grids $S_2$ and $S_3$ of tubes $V_2$ and $V_3$, respectively, are connected together and through resistor $R_{10}$ to the junction of equal resistors $R_9$—$R_9$ which are connected in series between the plates $P_2$ and $P_3$ of tubes $V_2$ and $V_3$, respectively. The junction of resistors $R_9$—$R_9$ is also connected to the positive side of battery $B_4$. First control grid $G_3$ of tube $V_3$ is connected through resistor $R_6$ and potentiometer $R_7$ to the negative side of battery $B_1$. The junction of resistor $R_6$ and potentiometer $R_7$ is connected to ground through condenser $C_6$.

Section 3, the local oscillator, includes tube $V_6$ the filament $F_6$ of which is connected through leads #2 to battery $B_3$. The grid $G_6$ of tube $V_6$ is connected through condenser $C_{12}$ to one end of the center-tapped primary of transformer $T_1$. The other end of said primary is connected to the plate $P_6$ of tube $V_6$. Condenser $C_{11}$ is connected across the primary of transformer $T_1$, the center tap of which is connected through resistor $R_{12}$, and switch $SW_1$ to the positive side of battery $B_4$. Said center tap is also connected to ground through condenser $C_{10}$. The filament $F_6$ is connected through resistor $R_{13}$ to grid $G_6$.

The secondary of transformer $T_1$ is connected through condenser $C_{13}$ to the second control grids $M_2$ and $M_3$ of tubes $V_2$ and $V_3$, respectively. Control grids $M_2$ and $M_3$ are connected to ground through resistor $R_8$.

Plate $P_2$ of tube $V_2$ is connected through one of the two equal condensers $C_9$—$C_9$ to grid $G_4$ of tube $V_4$ of section 4. Plate $P_3$ of tube $V_3$ is connected through the other of condensers $C_9$—$C_9$ to grid $G_5$ of tube $V_5$, also of section 4. Grids $G_4$ and $G_5$ and connected together through condensers $C_8$—$C_8$ connected in series and also through resistors $R_{11}$—$R_{11}$ connected in series. The junction of the two equal condensers $C_8$—$C_8$ is connected to ground. Filaments $F_4$ and $F_5$ of tubes $V_4$ and $V_5$ are connected through leads # 1 to battery $B_1$. The junction of resistors $R_{11}$—$R_{11}$ is connected through battery $B_5$ to filament $F_4$—$F_5$. Balancing condensers $C_8$—$C_8$ are of equal capacitance and have a reactance approximately at the third harmonic of the audio-frequency supplied by section 3. The reactance of the condensers $C_8$—$C_8$ is somewhat less than the resistance of resistor $R_9$ in order to maintain good balance.

The plates $P_4$ and $P_5$ of tubes $V_4$ and $V_5$, respectively, are connected to either end of the center-tapped primary of transformer $T_2$. Plates $V_4$ and $V_5$ are connected through the center tap of said primary of transformer $T_2$ to the positive side of battery $B_4$. Screen grids $S_4$ and $S_5$ of tubes $V_4$ and $V_5$, respectively, are connected to the center tap of the primary of transformer $T_2$. The secondary of transformer $T_2$ is connected to a speaker.

In operation radio-frequency energy is collected by antenna A causing a voltage to appear across inductances $RFC_1$ and $RFC_2$. $C_2$ is an isolating condenser to prevent any direct potential from entering the receiver. $C_2$, however, provides a path for the radio-frequency energy. $RFC_1$ and $RFC_2$ have a combined series impedance which is high compared to the antenna impedance for all frequencies in the required range.

A wire of infinite length would make the best antenna for the receiver described herein. However, for practical purposes the size of antenna A must be governed by the expected field strength and the space available. Marked variations in response versus frequency will be experienced with short antennas. Relatively large inductance $RFC_2$ is used to allow low frequencies to be impressed across the grid $G_1$ and filament $F_1$ of detector tube $V_1$. Due to high distributed capacity, high inductance $RFC_2$ offers a low impedance path to high frequency energy. A separate small inductance $RFC_1$ is provided to impress high frequencies on the detector.

Tube $V_1$, a pentode type vacuum tube with low input capacity, acts as a "grid leak detector" performing the dual function of rectification, by diode action of the grid $G_1$ and filament $F_1$, and amplification of the direct current voltage produced in case of a continuous unmodulated radio-frequency and the low frequencies of a modulated carrier. Resistor $R_1$ and condenser $C_2$ provide a "grid leak and condenser." A voltage appearing across impedances $RFC_1$ and $RFC_2$ will cause rectification between grid $G_1$ and filament $F_2$ of tube $V_2$. The resultant current flow will cause a negative voltage to build up on grid $G_2$ and store in condenser $C_2$. This negative grid voltage causes a reduction in the plate current of tube $V_1$ and therefore a reduction in the voltage drop across resistors $R_3$, $R_4$ and $R_5$. If the voltage across impedance $RCF_1$ and $RCF_2$ is reduced, the negative voltage on grid $G_1$ will tend to leak away over resistor $R_1$.

Resistor $R_2$ provides the correct voltage for proper operation of screen grid $S_1$ or tube $V_1$. $C_3$ is a by-pass condenser of sufficient size to reduce the amplitude of high frequency voltage appearing on the plate of tube $V_1$ but not so large that an appreciable attenuation of modulation frequencies will result. Resistors $R_3$, $R_4$ and $R_5$ are a combined series of plate resistors such that the resultant plate potential of tube $V_1$ will be slightly negative in relation to the negative filament point of $V_2$ and of equal potential to the equivalent grid $G_3$ of tube $V_3$ with no signal, or a selected input signal, impressed upon the receiver. Resistors $R_4$ and $R_5$ are variable to allow adjustment of this potential and therefore balance the system. Resistor $R_4$ is made large with respect to $R_5$ so that rough and fine adjustment of balance may be made. Condenser $C_5$ is an audio by-pass for the plate return circuit of tube $V_1$.

Resistor $R_7$ is a variable resistor to permit initial adjustment of the bias on tube $V_3$. The sensitivity may be controlled to some extent by this adjustment. Condenser $C_6$ is the by-pass for this control. Resistor $R_6$ simulates the resistance in the circuit of grid $G_2$ of tube $V_2$ and allows grid $G_3$ to operate under the same conditions as grid $G_2$. Resistor $R_{10}$ provides proper screen voltage for screen grids $S_2$ and $S_3$ of tubes $V_2$ and $V_3$. Resistor $R_{10}$ is by-passed for audio-frequency by condenser $C_7$.

In section 3, the primary of transformer $T_1$ and condenser $C_{11}$ act as a tank circuit and receive power from the filament-plate circuit of triode $T_6$ to produce an audible tone. The grid $G_6$ of triode $V_6$ is coupled to the tank circuit through condenser $C_{12}$ to give the necessary feedback to produce oscillation in the tank circuit. Resistor $R_{13}$ prevents the voltage of grid $G_6$ from floating. Resistor $R_{12}$ and condenser $C_{10}$ are used as a filter to prevent the tone produced by section 3 from spreading through the battery to other circuits. Condenser $C_{13}$ is used to couple the audio-tone produced by section 3 to the control grids $M_2$ and $M_3$ of tubes $V_2$ and $V_3$. Resistor $R_8$ provides a path for rectified audio-current resulting from the application of a strong audio source to grids $M_2$ and $M_3$ which are only slightly biased.

With equal voltages applied to grids $M_2$ and $M_3$ of tubes $V_2$ and $V_3$, as long as equal voltages are applied to grids $G_2$ and $G_3$, equal voltages will appear across resistors $R_9$—$R_9$ and be applied through coupling condensers $C_9$—$C_9$ to grids $G_4$ and $G_5$ of tubes $V_4$ and $V_5$. With equal voltages applied to grids $G_4$ and $G_5$ equal and opposite currents will flow through the primary of transformer $T_2$ and no current will be induced in the secondary of transformer $T_2$ and impressed on the speaker. However, if the voltage on grid $G_2$ is varied with respect to the voltage on grid $G_3$, the balance of the system is impaired and an indication will be given at the speaker.

For reception of keyed unmodulated radio-frequency energy, the apparatus is balanced by removing the antenna A, turning the audio-oscillator on by closing switch $SW_1$ and adjusting resistors $R_4$ and $R_5$ until no signal, or until a selected minimum signal, is heard at the speaker. The antenna is then connected. If a radio telegraph station of sufficient intensity is then operated, a signal will be collected by antenna A detected by tube $V_1$ and impressed on grid $G_3$ of tube $V_2$ as explained above. As the original adjustment for balance resulted in equalizing the voltages on grids $G_2$ and $G_3$, the change caused by the received signal will unbalance the circuit and cause the audible tone from section 3 to be amplified in section 4 and reproduced by the speaker. If the transmitter is keyed, obviously the tone will appear and disappear in accordance with the keying. For reception of modulated radio signals, it is only necessary to turn off the local oscillator in section 3 by opening switch $SW_1$ and adjust resistors $R_4$ and $R_5$ for the most sensitive position. In this case sections 2 and 4 act simply as audio-amplifiers.

An increase in sensitivity may be obtained by using a separate diode rectifier replacing the grid rectifier and allowing tube $V_1$ to act purely as a direct current amplifier. Additional direct current amplifiers may be added increasing the sensitivity to the limit set by the noise generated in the input circuit. It will be understood that when keyed, unmodulated radio-frequency energy is being received, a long pulse of continuous wave will result in only direct current flowing through the circuit after detection and before the local oscillation is applied in section 2. An aperiodic input to the receiver is most readily obtained by using a rectifying element with extremely low input capacity and by using sectionalized inductances to reduce the input capacity. If this input capacity can be kept low in relation to the antenna capacity the response will remain relatively constant through a large range of frequencies. As stated previously, the length of the collector wire will generally be the determining factor.

If the sensitivity of an efficient aperiodic receiver is increased sufficiently many signals will be heard simultaneously. Under such conditions it is possible to reduce the receiver band width, and therefore, the number of stations received, by the use of suitable filters. Such filters may be inserted ahead of the input circuit and may be any of the usual forms, such as band pass, band elimination, or simple resonant circuit. The addition of a simple tuned circuit will increase the sensitivity materially by reducing the detrimental effects of a collector of finite length. A calibrated tuned circuit can be used to determine the approximate frequency of the received signal and aid in locating the exact frequency when using other receiving systems.

In place of the audio reproducer shown in the drawing a visual indicator such as a meter or cathode ray tube may be used to indicate reception of a signal. In this case an indication of the signal intensity may be obtained. Various types of recording systems may be used with the receiver to permit automatic monitoring with the receiving equipment unattended. The indicator could be arranged to show intensity against frequency.

The above specification and drawing describe a preferred embodiment, but many modifications within the scope of the appended claims will occur to those skilled in the art.

What is claimed is:

1. In combination an antenna connected to at least one inductance coil, a first electronic discharge device having at least a plate, control grid, and cathode electrodes, said control grid being connected to one side of said inductance coil through a capacitor shunted by a resistor, said cathode being connected to the other side of said inductance coil, whereby said first electric discharge tube functions as a grid leak detector, a second and third electric discharge device each having at least a plate, cathode, and first and second control grid, the cathode of said first and second electric discharge device being connected together, the first grid of said second electric discharge device being connected directly to the plate of said first electric discharge device, the first grid of said third electric discharge device being connected to an adjustable source of potential whereby the first grid of the third electric discharge device may be adjusted to the normal potential of the first grid of the second electric discharge device, means for producing a local frequency, means for supplying said frequency to the second grids of said second and third electric discharge device, the plates of said second and third electric discharge device being connected in opposition in an output circuit whereby the local frequency does not appear in said output circuit unless radio energy is received by said antenna.

2. An antenna connected to an impedance, a detector connected across said impedance, said detector having an output, first and second vacuum tubes each having first and second control electrodes and an output electrode, said output electrodes being connected in opposition, an oscillator for producing a local frequency, means for applying said local frequency to the second control electrodes of each of said first and second vacuum tubes, a direct connection between the output of said detector and the first control electrode of one of said vacuum tubes, means for applying an adjustable steady potential to the first control electrode of said second vacuum tube equal to that existing on the first control electrode of said first vacuum tube when no radio signal is received by said antenna whereby when a radio signal is received by said antenna the first and second vacuum tubes become unbalanced and produce an output.

3. An antenna connected to an impedance, a grid-leak detector having an input and an output, said input being connected across said impedance, an amplifier stage comprising a first and second vacuum tube each having a first and second input and an output, the output of said detector being directly connected to the first input of said first vacuum tube, the first input of said second vacuum tube being connected to an adjustable source of potential, a device for generating a local frequency, means for supplying said local frequency to the second input of said first and second vacuum tubes, said outputs of said first and second vacuum tubes being connected in opposition, and switching means operable to prevent application of said local frequency to said second inputs.

JAMES P. VEATCH.
WILLIAM J. HOFFERT.

REFERENCES CITED

The following references are of record in the file of this patent:

UNITED STATES PATENTS

| Number | Name | Date |
|---|---|---|
| 1,464,322 | Kolster | Aug. 7, 1923 |
| 1,593,837 | Mathieu | July 27, 1926 |
| 1,615,636 | Langmuir | Jan. 25, 1927 |
| 2,127,525 | Marshall | Mar. 19, 1940 |
| 2,383,126 | Hollingsworth | Aug. 21, 1945 |
| 2,400,133 | Pray | May 14, 1946 |